(12) United States Patent
Rice et al.

(10) Patent No.: US 9,996,758 B2
(45) Date of Patent: Jun. 12, 2018

(54) BIOMETRIC SENSOR FOR DETECTION OF WRIST BLOOD VESSELS IN A WRIST STRAP

(71) Applicant: Biowatch SA, Martigny (CH)

(72) Inventors: Joseph Rice, Notthingham (GB); Matthias Vanoni, Montreux (CH)

(73) Assignee: Biowatch SA (CH)

( * ) Notice: Subject to any disclaimer, the term of this patent is extended or adjusted under 35 U.S.C. 154(b) by 90 days.

(21) Appl. No.: 15/046,187

(22) Filed: Feb. 17, 2016

(65) Prior Publication Data

US 2016/0283809 A1    Sep. 29, 2016

(30) Foreign Application Priority Data

Mar. 27, 2015 (EP) .................................... 15161422

(51) Int. Cl.
*G06K 9/00* (2006.01)
*A45F 5/00* (2006.01)
*G06F 21/32* (2013.01)
*H04N 5/33* (2006.01)

(52) U.S. Cl.
CPC ............ *G06K 9/00885* (2013.01); *A45F 5/00* (2013.01); *G06F 21/32* (2013.01); *G06K 9/00013* (2013.01); *G06K 9/00375* (2013.01); *H04N 5/33* (2013.01); *A45F 2005/008* (2013.01); *G06K 2009/00932* (2013.01)

(58) Field of Classification Search
None
See application file for complete search history.

(56) References Cited

U.S. PATENT DOCUMENTS

| 4,699,149 | A | 10/1987 | Rice |
| 6,799,726 | B2 | 10/2004 | Stockhammer |
| 7,174,032 | B2 | 2/2007 | Takiguchi et al. |
| 8,019,126 | B2 | 9/2011 | Amano |
| 2006/0288233 | A1 | 12/2006 | Kozlay |
| 2008/0081968 | A1* | 4/2008 | Numada ............ A61B 5/02007 600/322 |

(Continued)

FOREIGN PATENT DOCUMENTS

| EP | 1387309 A2 | 2/2004 |
| EP | 2328111 A1 | 6/2011 |
| WO | WO-01/54074 A1 | 7/2001 |

OTHER PUBLICATIONS

S. Cassidy, "Business Technology; A Card That 'Sees' User's Veins", NYTimes.com; 1988; pp. 1-3.

(Continued)

*Primary Examiner* — Bernard Krasnic
(74) *Attorney, Agent, or Firm* — Blank Rome LLP

(57) ABSTRACT

A biometric sensor apparatus for capturing patterns of blood vessels on the inner side of a wrist. The sensor apparatus has a strap with a near infrared camera mounted on a part of the strap. The camera is arranged for capturing an image of the blood vessels when it is temporarily held at an increased distance from the wrist than when the apparatus is simply being worn by the user. In some embodiments the camera is held at the required position for capturing the images of the blood vessels when the wrist strap is being opened or closed. In some embodiments the camera may be mounted in a deployant clasp of the wrist strap.

18 Claims, 5 Drawing Sheets

(56) References Cited

U.S. PATENT DOCUMENTS

| | | | |
|---|---|---|---|
| 2009/0005661 A1* | 1/2009 | Ozawa | A61B 5/681 600/322 |
| 2009/0169078 A1* | 7/2009 | Ozawa | A61B 5/0059 382/128 |
| 2010/0130841 A1* | 5/2010 | Ozawa | A61B 5/681 600/323 |
| 2010/0237990 A1 | 9/2010 | Amano et al. | |
| 2013/0314303 A1* | 11/2013 | Osterhout | G06F 3/005 345/8 |
| 2014/0107493 A1 | 4/2014 | Yuen et al. | |
| 2014/0196131 A1 | 7/2014 | Lee | |
| 2015/0366518 A1* | 12/2015 | Sampson | A61B 5/7221 600/301 |
| 2016/0029778 A1* | 2/2016 | Fitzgerald | A45F 5/02 224/272 |

OTHER PUBLICATIONS

J. Rice, "A Third Way for Biometrics [long]", Google Groupes, Mar. 29, 1999, pp. 1-5.

J. Rice, "The Future of Vein Recognition", Biometrics, Apr. 2001, pp. 1-4.

* cited by examiner

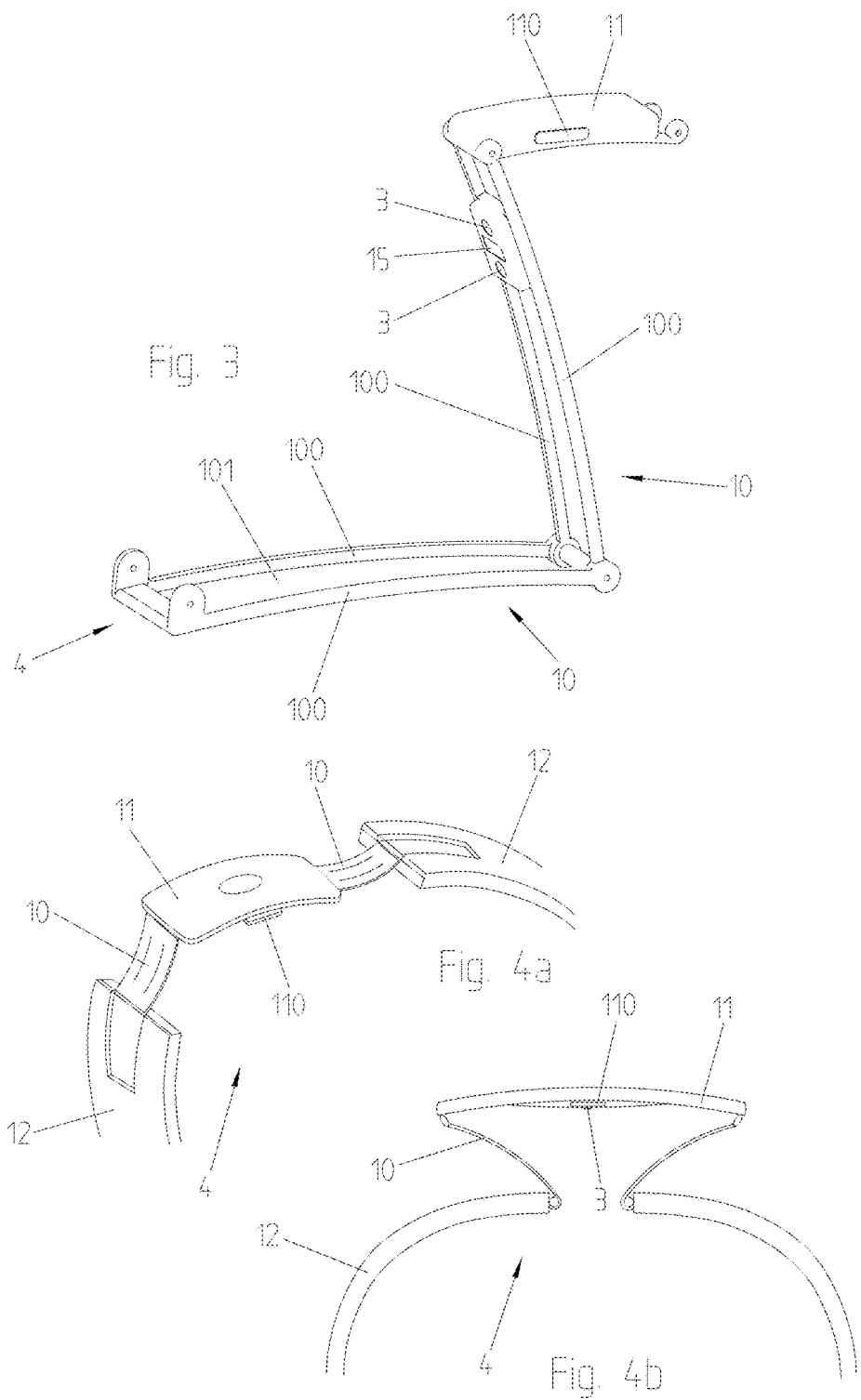

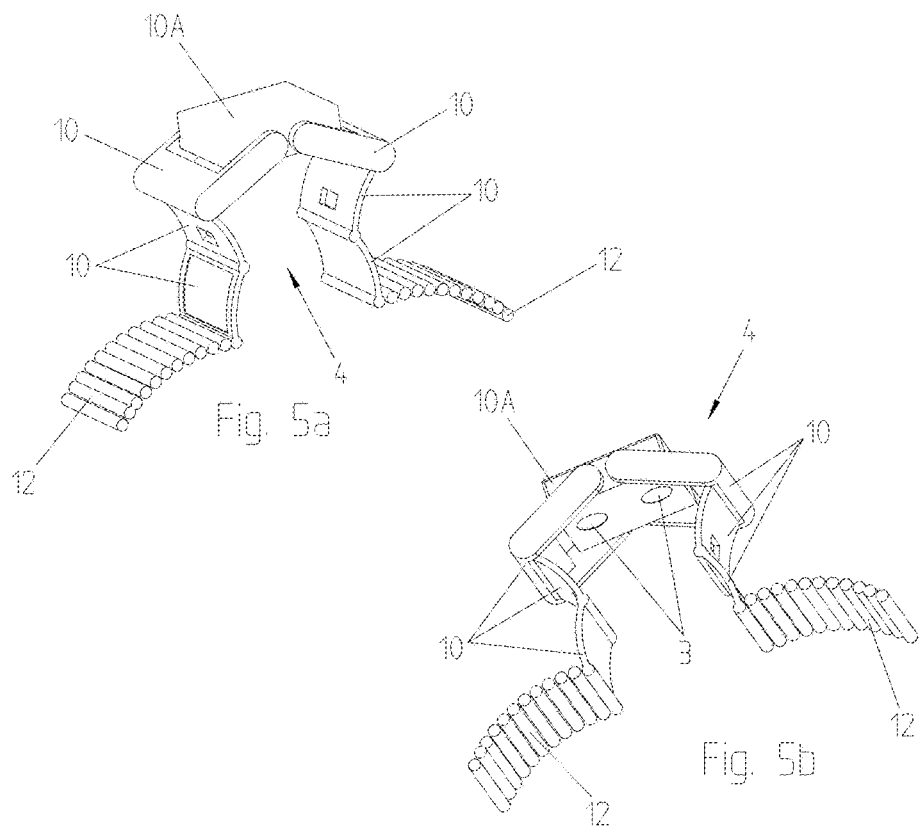
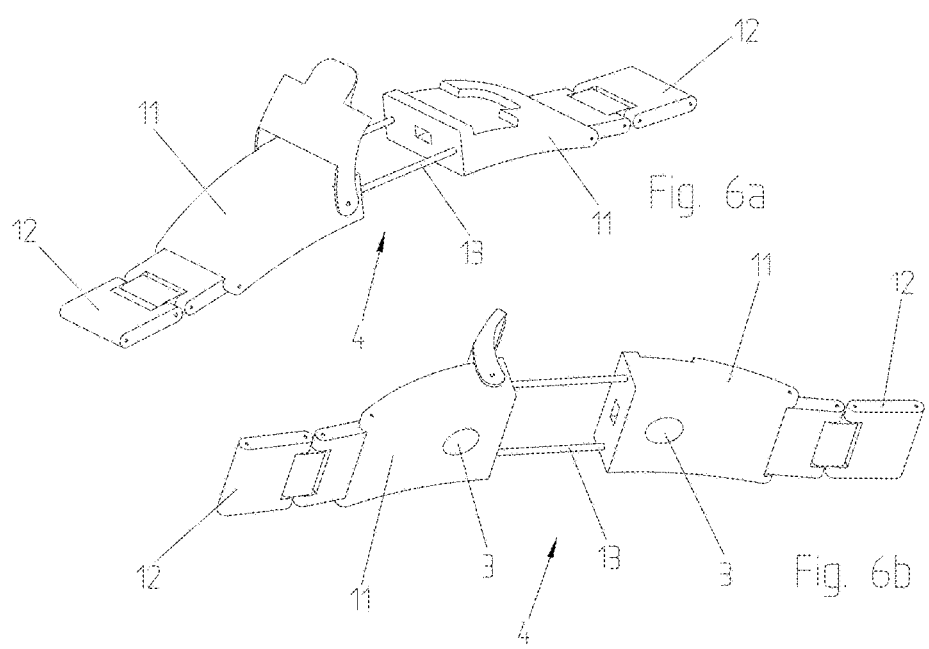

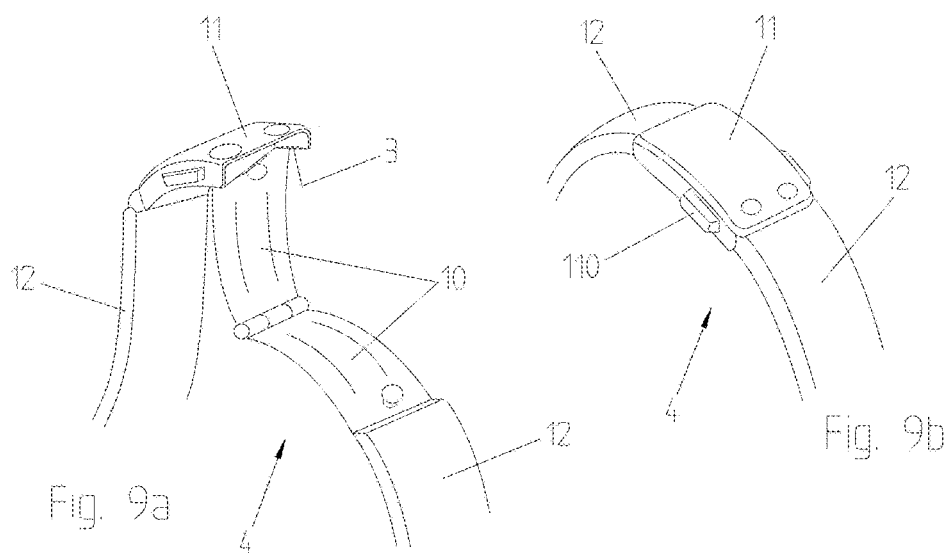
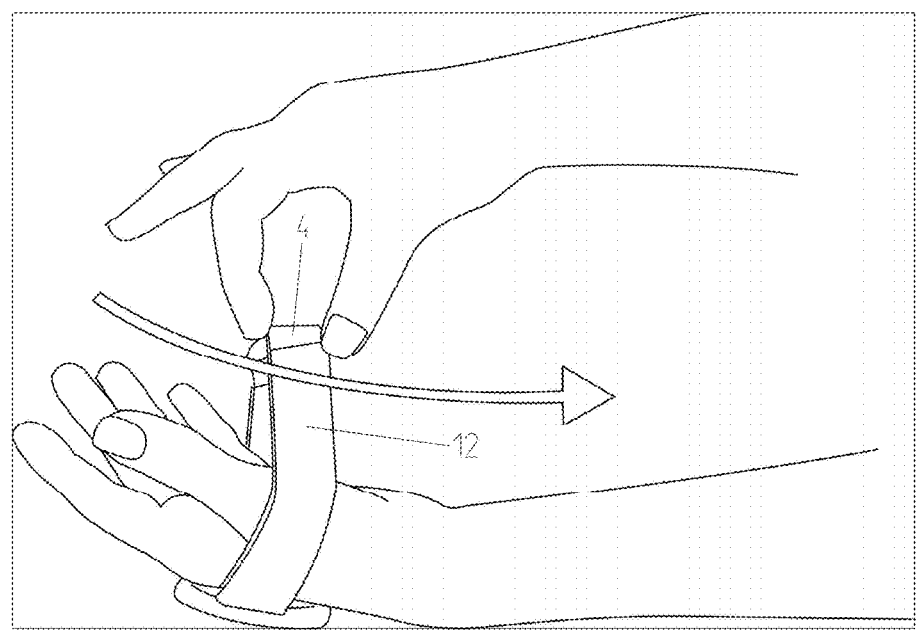

BIOMETRIC SENSOR FOR DETECTION OF WRIST BLOOD VESSELS IN A WRIST STRAP

RELATED APPLICATION

This Application claims priority of European Patent Application EP15161422.9 filed on Mar. 27, 2015, the contents of which is herewith enclosed by reference.

FIELD OF THE INVENTION

The present invention concerns a biometric sensor for detection of wrist blood vessels in a wristwatch.

DESCRIPTION OF RELATED ART

Biometrics is widely used in order to authenticate or identify users. Biometrics is often based on fingerprint, voice, retina, iris, palm, face or wrist vessel recognition. The present application is related to biometric sensors used for authenticating or identifying users based on patterns of blood vessels in the wrist.

The subcutaneous blood vessels on a human wrist can be imaged using infrared illumination and in particular, near infrared (NIR) illumination.

This technology is disclosed, among other, in an article published by the New York Times and related to a smart card carrier that reads veins. The article is available at http://www.nytimes.com/1988/12/14/business/business-technology-a-card-that-sees-user-s-veins.html An oral presentation on this subject was also made by Mr Joe Rice at the Biometric Summit in Washington, D.C. in January 1999. This lecture was subsequently published in the Information Systems Audit and Control Associations Journal, and is available at https://groups.google.com/forum/#!msg/comp.society.privacy/gynQOQHXzmQ/6LpJubLOWmwJ.

The web page "http://fingerchip.pagesperso-orange.fr/biometrics/types/vein_JoeRice.htm" describes another aspects of vein pattern biometric and how it can be applied to safeguarding the individuals privacy and security.

U.S. Pat. No. 8,019,126B2 describes a biometric data acquisition device to be worn around the wrist. The device comprises a biometric acquisition unit for acquiring a vein pattern of a living body, and an authentication unit for performing personal authentication using the vein pattern acquired by the biometric acquisition unit. The biometric data acquisition unit includes a light source unit that emits illuminating light, such as a LED or a circular light source unit, and a light receiving unit such as a CCD device and micro lens arrays provided on one main surface of the circular basis of the wristwatch. This document does not describe the technology used to manufacture the light source unit and the CCD device. Conventional technology would result in a thick, flat device that is difficult to integrate in a wristwatch, especially in a flat wristwatch. Moreover, large CCDs which are required in order to scan a large area of the dorsal area of the wrist are expensive and power-consuming.

U.S. Pat. No. 6,799,726B2 describes a wristwatch having a biometric sensor positioned so as to rest on the skin and detect the subcutaneous pattern or arteries, veins, capillaries and other blood vessels. The technology used to manufacture the sensor is not described.

U.S. Pat. No. 7,174,032B2 describes an apparatus with a pickup section for picking up an image of a blood vessel pattern of a wrist. The pickup section is provided with a near-infrared LED an IR camera, such as a CCD camera. The apparatus is voluminous and intended to be integrated in a chair armrest.

U.S. Pat. No. 4,699,149 discloses an apparatus for identifying an individual based on his detected blood vessels. The apparatus comprises infra-red radiation emitting diodes and reflecting radiations sensing means.

US20140196131 discloses a wearable wrist vein pattern device for authentication applications. The wrist device comprises illuminators, such as LEDs or VCSELs Lasers, and an array of wrist contact sensors, e.g. CCD sensors.

EP2328111 describes a biometric pattern detecting method and device adapted to detect subcutaneous blood vessels for authentication applications. The device exploits optical, electrical and/or temperature discriminants between epidermal tissue and deep-layer tissue of the skin. In one embodiment, tissue structures are established by a plurality of temperature detecting devices arrayed upon the skin. A two-dimensional array of detecting temperature devices, e.g. thermistor, bolometers, thermopiles, is arranged to detect epidermal layer temperatures.

A problem common to those prior art devices is their thickness which make them difficult to integrate in a wristwatch or bracelet for a wristwatch.

Another problem is the cost of designing and manufacturing sensors in various different dimensions. Wristwatches and bracelets exist in a large variety of sizes and forms, and it would be desirable to adapt the size and form of the sensor to each specific design. However, the cost of producing small series of devices using conventional photolithography technologies is prohibitive.

Another problem is the small size of the area which can be imaged with an infrared sensor that rests directly on the skin. The area is limited by the surface of the back of the watch in contact with the skin, usually a circle with a diameter of 42 mm or less. This surface is insufficient for capturing a pattern of blood vessels large enough to perform a reliable authentication. Moreover, wristwatches do not always rest on the same area of the wrist, but are often held relatively loosely so that they can rotate and slide along the wrist. Therefore, the reference pattern of blood vessels and the test pattern often correspond to different areas of the wrist, resulting in many legitimate users being rejected.

Most conventional solutions are integrated in the back of a wristwatch and therefore intended for capturing patterns of blood vessels on the dorsal side of a wrist. This dorsal side is however poorly irrigated and contains less vessels than the inner side of the wrist. Therefore, the authentication is based on a matching between limited number of vessels, and therefore not very reliable.

It is therefore an aim of the invention to provide an apparatus that solves or mitigates the problems of those prior art solutions.

BRIEF SUMMARY OF THE INVENTION

According to the invention, these aims are achieved by means of a biometric sensor apparatus for capturing images of patterns of blood vessels on the inner side of a wrist, comprising:
   a portion of wrist strap;
   a near infrared camera mounted on said portion and arranged for capturing focused images of said patterns when said portion is held at a distance greater than 10 mm of said wrist during closure or opening of the wrist strap.

The apparatus may be for example a wristwatch, a wrist strap (bracelet), etc.

In this application, the expression "image" should be given a broad meaning so as to encompass different concepts. An image could be a picture or reproduction, for example on paper or on a display. An image could be data corresponding to such a reproduction, for example a file such as a tif file, a jpeg file etc. An image could correspond to a visible phenomenon, for example a reproduction in a visible range of what a human or visible length sensor would see, or to something not visible, for example data or reproduction of values captured by a sensor such as an infrared sensor, a near-infrared sensor, a temperature sensor, etc.

The camera is provided on the inner side of a portion of the wrist strap and could thus be used to identify a user when accessing applications and/or web sites with a smartwatch mounted onto said strap, for example, or with a computer, mobile phone or tablet connected with this strap. The identification is thus provided by a proof of possession of an object (the wrist strap) and by biometric features.

By capturing images when the inner side is at a distance from the wrist, for example at a distance of more than 10 mm, for example more than 20 mm, it is possible to capture a relatively large area of the wrist. This makes the matching with reference images more reliable, since it could be based on a larger network of blood vessels and larger number of features. Moreover, it is more likely that a sufficient portion of the captured image will correspond to a portion of a corresponding reference image.

The camera is preferably adapted for capturing a focused image of the blood vessels during opening or closing of the wrist and when the camera is held at a distance greater than 10 mm (preferably 20 mm) and lower than 10 mm (preferably lower than 50 mm) to the inner side of the wrist.

Capturing images from a distance also makes the illumination easier, since a relatively large portion of the inner side of the wrist could be illuminated with an illuminating unit for illuminating a portion of said inner side.

The sensor may be mounted on a deployant clasp of the strap.

The deployant clasp may comprise a plurality of blades overlapped when the clasp is closed and juxtaposed when the clasp is deployed. The clasp may be a butterfly clasp, a flip clasp, a diapason clasp, etc. It may comprise two or three blades.

The camera may be mounted onto one of said blades.

The clasp may comprise a cover over the blades. The cover may house the camera.

At least one of the blades may comprise a window, for example an opening between two parallel branches of the blade. The camera may be arranged for capturing an image of the blood vessel pattern through this window.

A camera may be mounted on the lower (inner) side of the clasp.

A camera may be mounted on a lateral side of said clasp, and oriented toward the inner side of the wrist when the clasp is secured.

The wrist strap may be elastic in order to increase the distance between said camera and said wrist temporarily during the capture.

The apparatus may comprise a button for triggering the capture when the user activates said button. This button may also be used to open and/or to close the clasp.

The apparatus may be arranged for automatically triggering a capture when a user closes the wrist strap, for example when he closes the clasp.

In one example, the apparatus includes an accelerometer for automatically triggering a capture when a closure movement is detected.

The apparatus may be arranged for automatically capturing a sequence of images of blood vessel patterns when a user closes said wrist strap or when a user activates a capture.

The apparatus may further comprise a computer vision software module for analysing sequences of images captured with the camera at various distances and/or orientation relative to the wrist, and selecting at least one image comprising a desired portion of the wrist. In one embodiment, the capture of a sequence is triggered manually by the user, or automatically when the clasp is secured. Among those successive images in the sequence, only those which are focused and pointed at a relevant portion of the wrist are used for the authentication or identification process.

The apparatus may comprise a plurality of cameras, each of said cameras being arranged for capturing a plurality of sequences of images of said wrist.

The apparatus may comprise a processor for processing data measured by said sensor in order to identify or authenticate a user.

The apparatus may comprise a software module executable by a processor for causing said processor to stitch a plurality of images of different portions of the wrist, for example successive images from one camera, and/or images captured with different cameras.

BRIEF DESCRIPTION OF THE DRAWINGS

The invention will be better understood with the aid of the description of an embodiment given by way of example and illustrated by the figures, in which:

FIG. 3 is a top view of a second embodiment of an apparatus according to the invention.

FIGS. 4a and 4b are a perspective and side view of a third embodiment of an apparatus according to the invention.

FIGS. 5a and 5b are two isometric views of a fourth embodiment of an apparatus according to the invention.

FIGS. 6a and 6b are two an isometric views of a fifth embodiment of an apparatus according to the invention.

FIGS. 9a and 9b are two isometric views of an eighth embodiment of an apparatus according to the invention, in an open respectively closed state.

FIG. 10 illustrates how a sequence of images may be captured when the strap is moved with a camera at a distance from the wrist.

DETAILED DESCRIPTION OF POSSIBLE EMBODIMENTS OF THE INVENTION

Figure 1:
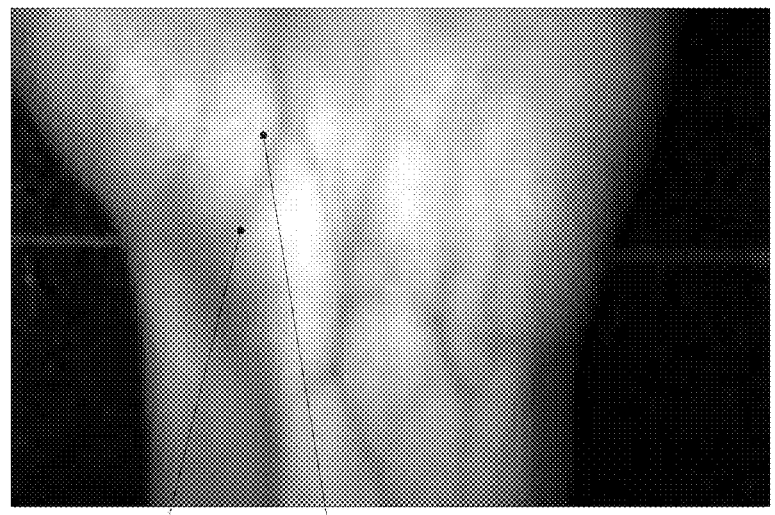
FIG. 1 shows an image of a pattern of blood vessels in a human wrist.

FIG. 1 illustrates an image 1 of the inner side of a human wrist captured with a common CCD camera. It shows a pattern of blood vessels 30, in particular veins, clearly distinguishable among the surrounding tissues 31. In one example, this image is a reproduction in the visible range of data captured with a near-infrared or temperature sensor. This pattern constitutes a unique feature of the person and could be compared with one or a plurality of reference patterns in order to identify or authenticate this person.

Figure 2:
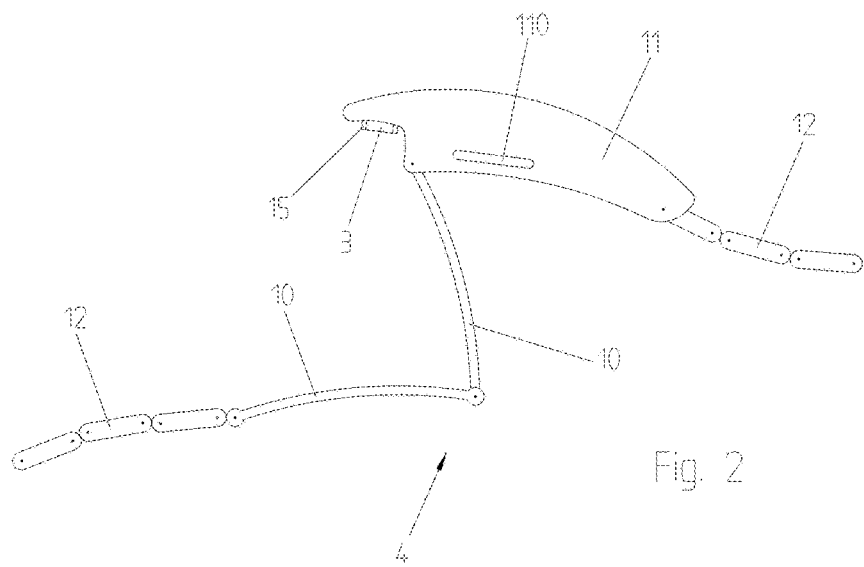
FIG. 2 is a side view of a first embodiment of an apparatus according to a first embodiment of the invention.

FIG. 2 illustrates a first embodiment of an apparatus according to the invention. In this embodiment, the strap 12 comprises a deployant flip clasp (or buckle) 4 with two articulated blades 10 which are superimposed or juxtaposed when the clasp is closed. One of the blades, preferably the lower blade 10, may comprise two parallel branches 100 with a window 101 between them in which the upper blade is inserted when the clasp is closed. A cover 11 is connected to one blade on one side and to one branch of the strap on the other side. This cover covers at least partly the two blades 10 when the clasp is closed, and might comprise locking means for holding the clasp securely closed, or for opening it by acting on at least one button 110.

A camera 3 is mounted on a lateral side of the cover 11 and oriented toward the inner side of the wrist when the clasp is normally closed. This camera (as in all further embodiments) may comprise a CCD sensor for capturing images of the pattern of blood vessels in a near-infrared wavelength. The use of near-infrared wavelength makes the capture less sensitive to ambient light. A lens (not shown) may be provided in front of the camera 3 for controlling the size of the captured portion of wrist, and for focusing the image on the camera when the camera is at a suitable distance to the wrist. The focusing distance may be in a range between 10 and 80 mm.

The image of the wrist may be captured between the two branches 100 of the lower blade 10, and on both sides of this lower blade.

The camera 3 may be controlled for capturing a sequence of images from various distances and various orientations when the clasp is closed. As illustrated with FIG. 10, the sequence of images may comprise images of the inner side of the wrist, and/or images of at least some fingers and/or images of the palms; all those images may be captured when the clasp 4 is closed and while the camera is moved at a distance from the fingers, palm and/or wrist. The images may be used for authenticating or identifying the user. The images of the wrist, palm and/or fingers preferably include blood vessels of the wrist, palm and/or fingers, respectively.

A computer vision software module may retain the suitable images in the sequence, for example the images which are focused and correctly oriented. Images of adjacent or overlapping portions of the fingers, palm and/or wrists may be stitched into a larger image. Successive images of a same area may be combined into a higher resolution, better focused, more dynamic and/or less noisy image of the area.

Illuminating lights 15, for example near-infrared LEDs or OLEDs, may be provided on the cover 11 for illuminating the portion of wrist to be imaged. Various lights emitting in various wavelengths, for example near-infrared leds and visible light leds, may be provided in order to capture, simultaneously or sequentially, different images of a same portion of the body illuminated with different wavelengths.

In one embodiment, the skin is illuminated with light injected into a preferably flat light transmitive plate or foil acting as a light guide over or around or beneath the camera 3. A light source 15 injects light into the plate, which is internally reflected against the upper and lower surfaces. The upper and lower surfaces of the plate are structured with a grating in order to control the inner reflexions at the interface between the plate and the air, so as to control the intensity of light which is internally reflected or scattered outside the plate to illuminate the skin. The plate may be flat or bended. The image of the skin may traverse the plate and reach the sensor.

The illuminating sources 15 are preferably arranged such that light emanating from the illuminating sources coincide at a depth 3 mm below the surface of the skin to minimise back scatter into the photo diode array and to optimally illuminate the veins.

In one embodiment, the illuminating sources 15 are switched to provide a series of differently illuminated images which is integrated into a combined image to improve vein rendition.

The capture of a sequence of images may be triggered by the user, for example by acting on one of the buttons 110 used for locking/unlocking the cover or on additional dedicated button. In one embodiment, the action of triggering a capture of a sequence of images is provided by a pinch mechanism actuated by the finger and thumb on button 110 at both sides of the cover 11. Using the finger and thumb in this manner ensures that the camera is not inadvertently obscured as the image is taken.

Alternatively, or in addition, the capture may be triggered automatically when the clasp 4 is closed. In one example, a galvanic contact is established during the folding of the blades, which triggers a capture. In another embodiment, an inertial sensor (not shown) such as an accelerometer detects the closure of the clasp and triggers the camera 3.

FIG. 3 illustrates another embodiment of a flip clasp 4 with two blades 10 and one cover 11. In this example, the camera 3 and/or the lighting elements 15 are mounted on the upper blade 10 in order to capture an image of the wrist through the window 101 between the two branches 100 of the lower blade 10, and on both sides of this lower blade. The camera 3 may be equipped with a wide angle lens. It might be a near infrared camera. It might be equipped with an optical filter for blocking light outside of the near-infrared range.

The sensor further comprises an integrated circuit (not shown), for example an ASIC, for controlling the camera 3 and processing the images captured with this camera. The ASIC, as well as a battery for powering the camera and the sensor, might be mounted within the cover 11. Alternatively, the sensor and camera might be powered from a smartwatch mounted on the strap 12.

The lighting means, for example near infrared LEDs may also be mounted below the cover 11.

FIGS. 4a and 4b illustrate a wrist strap 12 with a butterfly clasp 4, i.e. a clasp comprising a central blade 11 and two lateral blades 10, one lateral blade being articulated at each extremity of the central blade 11 so that each lateral blade may be folded under (or above) one half length of the central blade when the clasp is secured in a closed state. The camera 3 (not shown) and the battery plus integrated circuit might be mounted into or below the central blade 11, with a focus distance of more than 10 mm in order to capture a focused view when the central blade 11 is at one distance of more than 10 mm from the wrist, palm and/or fingers.

FIGS. 5a and 5b illustrate another example of wrist strap 12 with a deployant clasp 4 comprising seven blades 10; the central blade 10A includes the electronics, the battery and two cameras 3 for capturing an image of the wrist from a distance of more than 10 mm. Lighting elements (not shown) may also be provided under the central blade 10A.

FIGS. 6a and 6b illustrate another example of wrist strap 12 with a clasp 4 comprising a cover 11 in two parts which can be moved against each other and secured together in a closed position. The two parts of the cover may be linked to each other by wires or cables 13 which are retracted into one part 11 when the cover is closed. The camera 3 and/or lighting elements (not shown) may be provided below one part 11 of the cover, so that it will be laterally moved when the clasp is closed, thus scanning a large portion of the wrist, palm and/or fingers.

Figure 7:
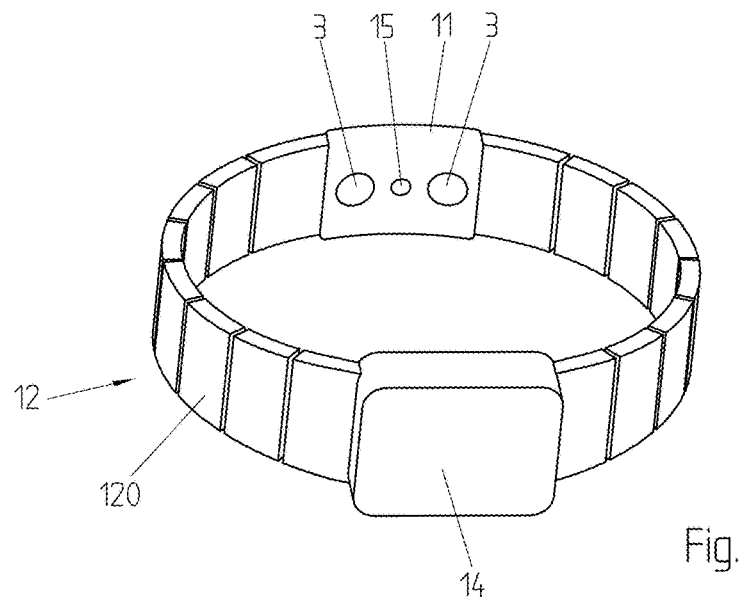
FIG. 7 is an isometric view of a sixth embodiment of an apparatus according to the invention.

FIG. 7 illustrates an example of a wrist watch comprising a case 14 for the watch movement and display, a strap 12 and a cover 11 having two cameras 3 and a lighting element 15 arranged for imaging the inner side of the wrist. The strap 12 comprises a plurality of links 120 elastically connected to each other, so that the wrist watch can be put on. By enlarging the strap 12 as in FIG. 10, it is also possible to move the cameras 3 at a distance from the wrist, for example at a distance of more than 10 mm, and to scroll it over the fingers, palm and wrist in order to image a larger portion of the fingers, palm and/or wrist. Another camera or blood vessel sensor might be provided below the cover of the watch 14.

Figure 8:
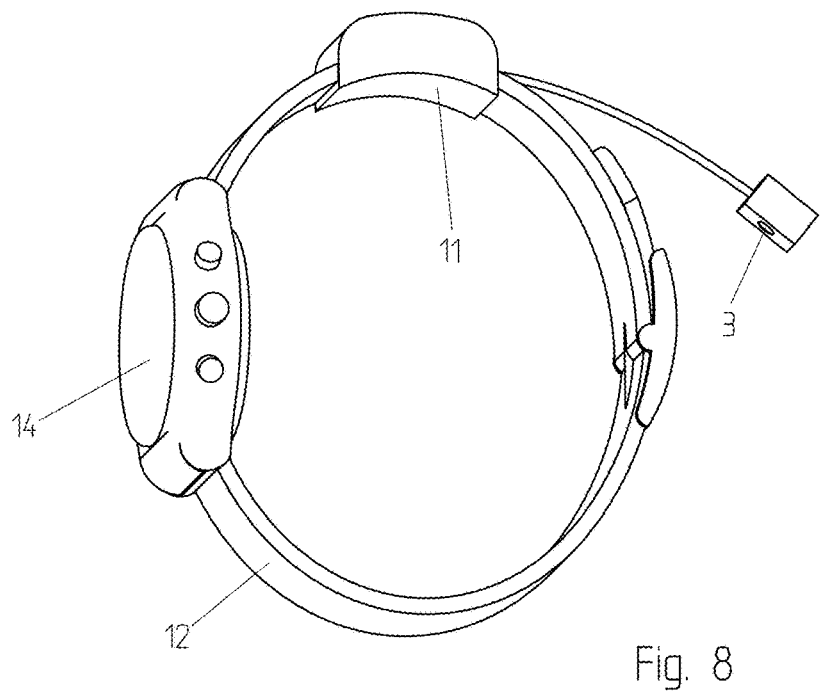
FIG. 8 is an isometric view of a seventh embodiment of an apparatus according to the invention.

FIG. 8 illustrates another example of wrist watch with a strap 12 comprising two branches; a camera 3, and possibly a lighting system, is mounted at one extremity of one branch, in order to capture a focused image of the wrist, palm and/or fingers from a distance of more than 10 mm.

FIGS. 9a and 9b illustrate another example of a strap 12 with a clasp 4 comprising two blade 10 and a cover 11. Two cameras are provided under the cover 11, as well as possibly a lighting element (not shown).

Features of the various embodiments could be combined. For example, it is possible to have a plurality of cameras in each of the described embodiments. Each embodiment could comprise lighting means, for example near-infrared LEDs, and/or a wide-angle lens, and/or an optical filter such as a polarizing filter and/or a near-infrared filter and/or a diffuser. In each embodiment, the camera 3 is arranged for capturing focus image of the blood vessels underneath the skin when the camera is at a distance of more than 10 mm, for example a distance of more than 20 mm, typically a distance between 25 and 50 mm.

The lighting means could comprise LEDs that encircle the camera lens in a circular or rectangular configuration. The Leds may be mounted in a black or brown plastic diffuser.

The reliability of the identification or authentication task depends on the number of distinguishing identification points in the captured image. Therefore, a high resolution image of a large portion of the user's wrist, preferably including portions of the palm and/or portions of the fingers, enables a more reliable recognition than a low resolution and/or small size image. A large size image could be captured with a large size sensor at a distance to the skin. Alternatively, it is also possible to capture a series of images of adjacent portions of the wrist, palm and/or fingers, and to assemble or stitch those successive images into a large size image corresponding to a larger portion of the wrist, palm and/or fingers. The wristwatch and the sensor are preferably moved, for example slid, between each image in the series. This movement might be the natural movement of one part of the clasp which is required in order to close the clasp.

It is also possible to increase the size of the captured portion by using a plurality of cameras. The resolution of the different cameras may be identical or different.

In one example, an additional sensor may be provided on the back of the watch or on the inner side of the clasp or strap, for capturing images of the wrist from a close distance (less than 5 mm, possibly 0 mm) to the wrist. This additional sensor may be manufactured with organic electronic components, for example organic photodetectors, printed on a substrate, for example a bendable substrate, preferably a plastic substrate. Organic photodetectors may be printed on this substrate, for example using ink-jet or other digital printing technology. These photodetectors are adapted for capturing light reflected by the skin in one or a plurality of wavelengths, for example in the near-infrared range. Different photodetectors onto the same substrate may be adapted for detecting light in different wavelengths.

The wristwatch or wristband may include a processor (not shown) for receiving the images from the sensor or sensors, possibly stitching those images, possibly detect spoofing attempts, and match those images with reference images in order to authenticate or identify the user.

A software module can be stored in a memory of the apparatus and executed by the processor for enhancing the contrast between the blood vessels and the rest of the image.

A software module can be stored in a memory of the apparatus and executed by the processor for removing noise in the image produced by the sensor and/or by the contrast enhancing module.

The different images produced at various wavelengths may be combined into a single image with more information. For example, the shadows and other area of an image in the visible wavelengths which are affected by the ambient light may be corrected with information from the infrared sensor which is less sensible to ambient light. Alternatively, the different images produced at different wavelengths ranges may be compared individually to reference images; in this later case, a decision for the identification/authentication may depend on the results of all classifications at different wavelengths.

The processor may further execute a module for matching a captured image with at least one reference image. In one embodiment, features of the captured image are compared with features of a reference image corresponding to an identity claimed by the user wearing the wrist band. This claimed identity may be for example entered by inputting an identification, possibly with a password, possible on the display of a smartwatch including the sensor, with a device such as a computer, smartphone or tablet connected to the smartwatch. This identity may be claimed for example each time a user starts his watch, or on demand each time he wants to access a protected application or web site for example.

Alternatively, features of the reference image are compared with features of one reference image stored in the smartwatch including the sensor, or in a smart card in this smartwatch. The reference image may be entered during an enrolment session for example when the user uses the sensor for the first time. In this case, the user does not need to claim his identity each time he needs to be authenticated with the biometric sensor; the role of the biometric sensor is mainly to make sure that the wrist band is worn by one authorised user.

In another embodiment, the biometric sensor is used for identifying the wearer of the band, by matching features of his biometric image with features of images corresponding to different users in order to identify which specific user has the wrist band.

The identification or authentication may be performed each time the user starts his apparatus, for example when he puts his watch, when he logs on into the operating system of a smartwatch. It could be performed on demand when the user requests access to a protected application, function or web site for example. It could be performed continuously, or at regular intervals. A plurality of successive images may be used, for example in order to improve the quality and reliability, and/or to detect aliveness of the user and prevent spoofing. In one embodiment, a first authentication is performed when the user put his watch, and a new authentication or confirmation of the previous authentication is performed on request when the user requests access to a protected application, function or web site for example.

The matching of images may comprise a step of aligning them on topographical features. It might comprise a step of extracting features from the captured images, and comparing those features with corresponding features in reference images.

The alignment may use the edges of the wrist, if both edges are visible. It may use the edges of the palm and/or fingers.

In one example of use, a watch user would place a watch with the sensor on his wrist and secure the clasp; he or she would then move the watch down to stop at the back of the hand where the width of the hand would stop further movement. This stop triggers a change in an accelerometer which starts a clock signal. The user then moves the watch up the wrist to stop at the point where the wrist thickens to prevent any further upward movement. As this movement is taking place the information from the sensor is written into a memory on each clock trigger to provide an image of the wrist, palm and/or fingers.

The invention claimed is:

1. A biometric sensor apparatus for capturing images of patterns of blood vessels on an inner side of a wrist, comprising:
   a wrist strap for holding the apparatus less than about 10 mm from said wrist;
   a near infrared camera mounted on a portion of said wrist strap, wherein said camera is arranged thereon configured to capture focused images of said vessels when said portion is temporarily held at an increased distance from said wrist, wherein said increased distance is between 10 mm and 80 mm, and preferably between 25 mm and 50 mm.

2. The apparatus of claim 1, further comprising a lens for controlling a size of a capturing portion of the wrist and for focusing the image on the camera.

3. The apparatus of claim 1, further comprising an illuminating unit comprising one or more illuminating lights for illuminating a portion of said inner side.

4. The apparatus of claim 3, said illuminating unit further comprising a light transmitive plate or foil acting as a light guide over or around or beneath said camera, said one or more illuminating lights arranged for emitting light into said plate or foil.

5. The apparatus of claim 1, said portion being a deployant clasp.

6. The apparatus of claim 5, said clasp comprising a plurality of blades overlapped when the clasp is closed and juxtaposed when the clasp is deployed.

7. The apparatus of claim 6, the camera being mounted onto one of said blades.

8. The apparatus of claim 6, further comprising a cover for closing said clasp, said cover housing said camera.

9. The apparatus of claim 6, at least one of said blades comprising a window, said camera being arranged for capturing an image of said patterns through said window.

10. The apparatus of claim 5, said camera being mounted on the lower side of said clasp.

11. The apparatus of claim 5, said camera being mounted on a lateral side of said clasp.

12. The apparatus of claim 1, said wrist strap being elastic in order to increase the distance between said camera and said wrist during the capture.

13. The apparatus of claim 1, further comprising a button for triggering said capture when a user activates said button.

14. The apparatus of claim 1, further comprising a computer vision software module for analysing sequences of images captured with said camera at various distances and/or orientation relative to the wrist, and selecting at least one image comprising a desired portion of the wrist.

15. The apparatus of claim 1, comprising a plurality of cameras, each of said cameras being arranged for capturing a plurality of sequences of images of said wrist.

16. The apparatus of claim 1, further comprising a processor and a software module executable by said processor for causing said processor to stitch images of different portions of the wrist.

17. A clasp for a wrist strap, the wrist strap for holding a biometric sensing apparatus at less than about 10 mm from a wrist, the apparatus for capturing images of patterns of blood vessels on an inner side of a wrist, the clasp comprising a near infrared camera configured to capture focused images of patterns of blood vessels on an inner side of the wrist when said camera, thus configured, is temporarily held at an increased distance from said wrist, wherein said increased distance is between 10 mm and 80 mm, and preferably between 25 mm and 50 mm.

18. A method of capturing images of patterns of blood vessels on an inner side of a wrist, using a biometric sensing apparatus and a wrist strap for holding the apparatus less than about 10 mm from said wrist, comprising:
   capturing a focused image of said blood vessels with a near infrared camera mounted on a portion of the wrist strap while temporarily holding the portion of the wrist strap having the infrared camera mounted thereon at an increased distance from the inner side of the wrist, wherein said increased distance is between 10 mm and 80 mm, and preferably between 25 mm and 50 mm.

* * * * *